United States Patent

Kizaki et al.

Patent Number: 5,332,342
Date of Patent: Jul. 26, 1994

[54] ELECTRODE TIP DRESSER AND CUTTER FOR ELECTRODE TIP DRESSER

[75] Inventors: Hiroyuki Kizaki; Kazuo Arai; Sadao Kamei; Toyoji Yamada; Takeshi Okubo; Kenji Takahashi; Yukihiro Yaguchi, all of Sayama, Japan; Tadashi Takeo, deceased, late of Sayama, Japan, by Kimie Takeo, Chiaki Takeo, Shiho Takeo, heirs

[73] Assignee: Honda Giken Kogyo Kabushiki Kaisha, Tokyo, Japan

[21] Appl. No.: 857,240

[22] Filed: Mar. 25, 1992

[30] Foreign Application Priority Data

| Apr. 26, 1991 | [JP] | Japan | 3-029748[U] |
| Apr. 26, 1991 | [JP] | Japan | 3-029749[U] |
| Apr. 26, 1991 | [JP] | Japan | 3-029750[U] |
| Apr. 26, 1991 | [JP] | Japan | 3-097611 |
| May 9, 1991 | [JP] | Japan | 3-032048[U] |

[51] Int. Cl.[5] .................. B23C 3/12; B23K 11/36
[52] U.S. Cl. .................. 409/140; 74/409; 219/119; 407/30; 407/42; 409/139
[58] Field of Search .......... 219/86.7, 119; 407/9, 407/33–35, 42; 408/203.5, 204, 205, 207, 211, 213; 409/139, 140175, 180, 181, 211; 82/113; 29/76.1; 74/409

[56] References Cited

U.S. PATENT DOCUMENTS

| 1,823,824 | 9/1931 | Dyas et al. | 409/139 |
| 2,286,931 | 6/1942 | Radeke | 409/181 |
| 2,930,289 | 3/1960 | Swarts | 408/211 |
| 3,971,293 | 7/1976 | Hunkeler | 74/409 |
| 4,147,071 | 4/1979 | Scribner et al. | 74/409 |
| 4,578,005 | 3/1986 | Fuse et al. | 409/140 |
| 4,762,446 | 8/1988 | Nishiwaki | 407/42 |
| 4,856,949 | 8/1989 | Shimada | 409/140 |
| 4,892,448 | 1/1990 | Hoch et al. | 409/181 |
| 4,966,504 | 10/1990 | Seme, Jr. et al. | 409/140 |
| 4,966,506 | 10/1990 | Slanker | 409/140 |

FOREIGN PATENT DOCUMENTS

| 7808551 | 8/1957 | Canada | 74/409 |
| 347397 | 12/1989 | European Pat. Off. | 407/35 |

Primary Examiner—Geoffrey S. Evans
Attorney, Agent, or Firm—Armstrong, Westerman, Hattori, McLeland & Naughton

[57] ABSTRACT

A cutter for use in an electrode tip dresser, which has a cutter holder for holding the cutter and dresses an electrode tip for a resistance welding apparatus, has a rising portion which has a cutting tooth for cutting a front peripheral portion of the electrode tip and a flat portion which faces a front end surface of the electrode tip. The flat portion has a single cutting tooth for cutting the front end surface of the electrode tip. The single cutting tooth extends from that central point of the cutter as and origin which coincides with an axis of rotation of the cutter holder towards a predetermined radial direction. An origin portion of the single cutting tooth further extends beyond the central point towards a direction which is opposite to the radial direction.

8 Claims, 11 Drawing Sheets

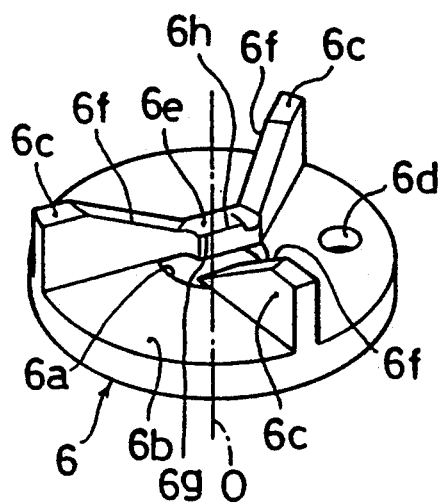
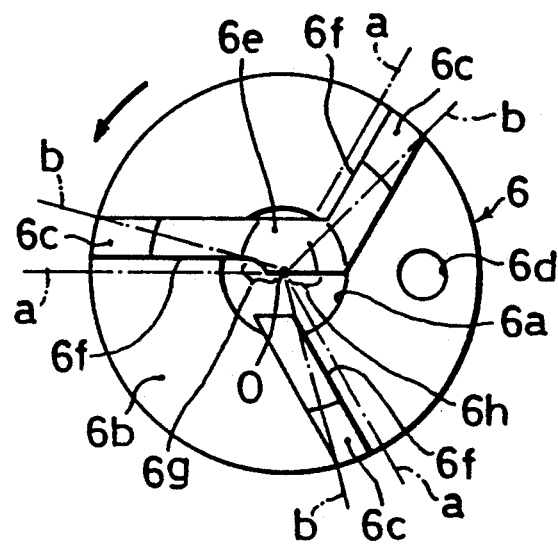
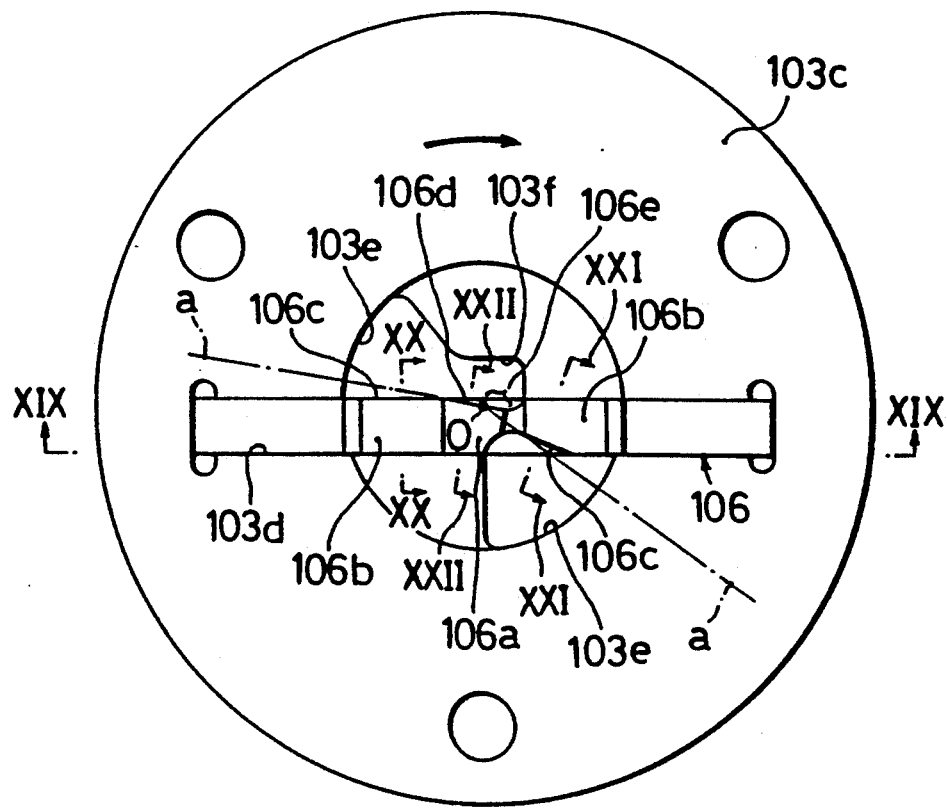

ELECTRODE TIP DRESSER AND CUTTER FOR ELECTRODE TIP DRESSER

BACKGROUND OF THE INVENTION

This invention relates to an electrode tip dresser which dresses or reforms an electrode tip for a resistance welding machine, and to a cutter for use in the electrode tip dresser.

An electrode tip dresser is constructed in the following manner. Namely, a cutter is held by a cutter holder which is rotatably held in a dresser main body. The cutter holder is rotated while an electrode tip is urged against the cutter so that the front end portion of the electrode tip is cut and dressed by the cutter.

Conventionally, this kind of cutter comprises a central column-like block and a plurality of cutter blades which radially extend from the block. A flat portion which faces the front end surface of the electrode tip is made up by an end surface of the column-like block, and a rising portion around the flat portion is made up by each of the cutter blades. Cutting teeth for cutting the front peripheral portion of the electrode tip are formed in the rising portion. A plurality of cutting teeth which extend from the center of rotation of the cutter holder radially towards each of the cutter blades are formed in the flat portion so that the front end surface of the electrode tip can be cut by these plurality of cutting teeth. However, if the plurality of cutting teeth are formed in the flat portion, the cutting teeth at the central portion at which they meet each other form a chisel edge, resulting in a disadvantage in that the central portion at the front end surface of the electrode tip cannot be cut well.

In order to solve this kind of disadvantage, there is disclosed in Japanese Published Unexamined Utility Model Application No. 44949/1990 a cutter which has formed in the flat portion thereof a single piece of cutting tooth which extends from the center of rotation of the cutter holder towards a predetermined cutter blade.

If the cutting tooth to be formed in the flat portion is made up of a single piece, the rake face angle and the relief angle can be accurately provided also at that origin portion of the cutting tooth which coincides with the center of rotation, thereby improving the cutting quality at the center of the front end surface of the electrode tip. However, in this cutter, the origin portion of the cutting tooth is short of rigidity and is likely to break at that portion. If that portion is broken, the cutter cannot be used any more since there remains uncut the central portion of the electrode tip.

OBJECT AND SUMMARY OF THE INVENTION

Taking the above disadvantages into consideration, this invention has an object of providing a cutter which comprises a single piece of cutting tooth to be formed at the flat portion to improve the quality of cutting the front end surface of the electrode tip and to prolong the lifetime of the cutter.

In order to attain the above-mentioned object, the cutter of this invention comprises: a rising portion which has a cutting tooth for cutting a front peripheral portion of the electrode tip; and a flat portion which faces a front end surface of the electrode tip; the flat portion comprising a single cutting tooth for cutting the front end surface of the electrode tip; the single cutting tooth extending from that central point of the cutter as an origin which coincides with an axis of rotation of the cutter holder towards a predetermined radial direction; the origin portion of the single cutting tooth further extending beyond the central point towards a direction which is opposite to the radial direction.

Since the origin portion of the single cutting tooth to be formed in the flat portion further extends beyond the central point of the cutter towards the opposite side, even if an edge or end at the origin portion were to be broken, there still does exist the cutting tooth up to the central point. Therefore, the central portion in the front end surface of the electrode tip will not remain uncut, and the lifetime of the cutter is prolonged.

Since the rake face of that portion of the cutting tooth which extends to the opposite direction looks opposite to the direction of rotation of the cutter, it does not function as a cutting tooth. However, it performs a function of rubbing or stroking the front end surface of the electrode tip to smooth it.

If the cutter is provided with a base plate which is seated on the cutter holder, and the base plate includes a plurality of cutter blades which are integrally and vertically provided thereon in radial directions, and the rising portion is formed by these cutter blades, the cutter can be mounted on the cutter holder only by inserting the base plate into a concave portion or the like in the cutter holder to seat it therein. The replacement of the cutter thus becomes easy. In this case, the single cutting tooth for cutting the front end surface of the electrode tip may be provided in the central portion of the base plate. However, since a centrifugal force does not act so much at the central portion of the cutter, chips are likely to be accumulated therein. On the contrary, if a chip-discharging hole is formed in the central portion of the base plate and a bridge is formed for bridging diametrically internal ends of predetermined two pieces of cutter blades of the plurality of cutter blades, across the chip-discharging hole to thereby form the flat portion, and further if the single cutting tooth for cutting the front end surface of the electrode tip is formed in the bridge, the chips can be effectively discharged out of the hole. It may be possible to extend a diametrically inside end portion of one piece of cutter blade towards the central direction to form in the extended portion a cutting tooth for cutting the front end surface of the electrode tip. However, in this construction, the extended portion forms a cantilever construction and is likely to give rise to chattering at the time of cutting. On the other hand, since the above bridge is supported at both ends thereof by two pieces of cutter blades, the front end surface of the electrode tip can be cut without giving rise to chattering.

There is conventionally known, in Japanese Published Examined Utility Model Application No. 10789/1985, an electrode tip dresser which comprises a cutter main body which is made up of a single piece of plate member which is longitudinal in the diametrical direction of a cutter holder, and a pair of cutting teeth which are formed in the cutter main body and extend from the central point, which coincides with the axis of rotation of the cutter holder, towards one as well as the other longitudinal directions of the cutter main body, the cutting teeth being in point-symmetry (i.e., symmetrical with respect to a point) with each other. Both cutting teeth thus cut the front end portion of the electrode tip.

However, in the above arrangement, a rake face of one cutting tooth must be formed by cutting one side surface of longitudinal one half of the cutter main body, and a rake face of the other cutting tooth must be formed by cutting the other side surface of the longitudinal other half of the cutter main body. In addition, the flanks of the one and the other of the cutting teeth, respectively, must be formed with opposite relief angles. The above requirements result in a higher manufacturing cost of the cutter as well as in a disadvantage in that, since the central point of the cutter forms a chisel edge, the central portion in the front end surface of the electrode tip cannot be cut well.

In addition, in the above arrangement, a special cutter suitable for a particular direction of rotation of the cutter holder must be manufactured. Also, in case a pair of upper and lower cutters are mounted on the cutter holder to simultaneously dress a pair of upper and lower electrode tips of a welding gun, or the like, the upper and the lower cutters must be manufactured in plane-symmetry (i.e., symmetrical with respect to a plane) with each other. This necessitates separate manufacturing of the upper and the lower cutters.

In order to eliminate the above-mentioned disadvantage, according to another aspect of this invention, there is provided a cutter comprising: a cutter main body formed by a single piece of plate member which is longitudinal in the diametrical direction of the cutter holder; a main cutting tooth for cutting the electrode tip, the main cutting tooth extending, from a central point which coincides with an axis of rotation of the cutter holder, towards one longitudinal direction of the cutter main body; and an auxiliary cutting tooth which is in plane-symmetry with the main cutting tooth and extends from the central point towards a longitudinally opposite direction of the cutter main body.

If the main cutting tooth is formed such that its rake face looks towards the normal direction of rotation of the cutter holder, the rake face of the auxiliary cutting tooth, which is in plane-symmetry with the main cutting tooth, looks towards the opposite direction of rotation of the cutter holder. Therefore, the front end portion of the electrode tip is cut by the main cutting tooth during normal rotation and by the auxiliary cutting tooth in the reverse rotation, respectively. Furthermore, one of the main and the auxiliary cutting teeth functions as the extension portion relative to the other and, therefore, the front end surface of the electrode tip can be cut without leaving uncut the central portion in the front end surface of the electrode tip.

In case where a pair of upper and lower cutters are mounted on the cutter holder to simultaneously cut a pair of upper and lower electrode tips, if the above-mentioned cutter is used both in the upper cutter and the lower cutter, the auxiliary cutting tooth of one of the upper cutter and the lower cutter cuts one of the electrode tips while the main cutting tooth of the other cutter cuts the other electrode tip.

In addition, since the main cutting tooth and the auxiliary cutting tooth are in plane-symmetry with each other, the rake faces of both cutting teeth as well as their flanks form continuous surfaces respectively, resulting in an easy machining of the cutter.

The arrangement disclosed in Japanese Published Unexamined Utility Model Application No. 10789/1985 has the following feature. Namely, a slit-like groove is formed in the cutter holder such that the widthwise center line of the groove coincides with the diametrical line of the cutter holder. The cutter is inserted into the groove and positioned such that the central point of the cutter, which coincide with the axis of rotation of the cutter holder, is positioned on the thickness-wise center line of the cutter. The cutter is thus formed with a pair of point-symmetrical cutting teeth which extend towards one and the opposite longitudinal directions of the cutter. Therefore, in manufacturing the cutter, it is necessary to cut into half a plate thickness of one side surface of one longitudinal half as well as the other side surface of the other longitudinal half, respectively, of a plate-like material so as to make up the rake faces of the respective cutters. The machining of the cutter is, therefore, time-consuming and the cutter must be made in a plate thickness twice as much as that required to secure the strength of each cutting tooth, resulting in a higher cost.

In order to eliminate the above-mentioned disadvantage, according to still another aspect of this invention, there is provided an electrode tip dresser for dressing an electrode tip for a resistance welding apparatus, the tip dresser comprising a rotatably driven cutter holder mounted on a dresser main body and a cutter of a single plate construction, the cutter being insertably held in a slit-like groove which is provided in the cutter holder and extends in the diametrical direction of the cutter holder, thereby cutting a front end portion of the electrode tip, wherein: the groove is formed in the cutter holder such that a widthwise center line of the groove is parallel with a predetermined diametrical line of the cutter holder and is slightly offset in a widthwise direction of the groove relative to the diametrical line; a central point, which coincides with an axis of rotation of the cutter holder, of the cutter to be held in an insertable manner in the groove is offset from the thickness-wise center line of the cutter towards one thickness-wise side surface of the cutter; a cutting tooth for cutting the front end surface of the electrode tip is formed on the above-mentioned one side surface of the cutter so as to extend to one longitudinal direction of the cutter through the central point; and a cutting tooth for cutting a front peripheral portion of the electrode tip is formed on an opposite side surface of the cutter so as to extend from an origin, which is away from the central point by a predetermined distance, to a longitudinally opposite direction of the cutter.

According to this arrangement, since the central point of the cutter approaches one side surface of the cutter, the thickness of the cutting tooth which is formed on the above-mentioned one side surface and extends from the central point towards the longitudinal one direction, to the opposite side surface of the cutter can be made larger. In addition, since there is formed, on the other side surface of the cutter, the cutting tooth which extends towards the longitudinal opposite direction off the central point, the thickness of the cutting tooth to the above-mentioned one side surface of the cutter can also be made larger. Therefore, the thickness of the cutter can be shortened to about half the above-mentioned conventional one. In addition, the amount of cutting of the material in manufacturing the cutter can also be kept small.

In case where welding is carried out on a motorcar body or the like with a welding robot having mounted thereon a resistance welding apparatus in the form of an X-shaped or C-shaped welding gun, it is normal practice to dispose an electrode tip dresser within an operating area of the robot so that the welding gun can be periodically moved to the position of installation of the electrode tip dresser to dress the electrode tip. In this case, if the center of the electrode tip is offset relative to the axis of rotation of the cutter holder provided in the electrode tip dresser, the front end portion of the electrode tip cannot be dressed to a desired shape. To cope with this problem, the following electrode tip dresser is proposed in Japanese Published Examined Patent Application No. 50555/1985. Namely, a plurality of cutter blades for cutting the front peripheral portion of an electrode tip are held by a cutter holder radially and in a manner slidable in the radial direction of the cutter holder. Each cutter blade is urged radially inwards so that, even if the electrode tip is slightly offset, the positional offset can be absorbed by the sliding movement of the cutter blades.

However, in this arrangement, since there must be provided a means to inwardly urging the plurality of cutter blades, respectively, the construction becomes complicated. In addition, since the plurality of cutter blades are independently slided, each cutter blade is subjected to vibrations due to cutting resistance, thereby resulting in so-called chattering. Consequently, the characteristics of the cut surface of the electrode tip become poor.

In view of the above-mentioned disadvantage, according to another aspect of this invention, there is provided an electrode tip dresser for dressing an electrode tip for a resistance welding apparatus, the tip dresser comprising a rotatably driven cutter holder provided on a dresser main body and a cutter which is held by the cutter holder, thereby cutting a front end portion of the electrode tip, wherein: a gear is formed on a periphery of the cutter holder; and a driving gear to be driven by a rotatably driving means and two pieces of supporting gears are respectively engaged at three peripheral points with the gear of the cutter holder while maintaining a respective backlash which allows a play of the cutter holder, whereby the cutter holder is radially movably supported by the driving gear and the supporting gears.

According to this arrangement, the cutter holder is radially movable within a range to be defined by the amount of backlash between each of the gears. Therefore, even if the electrode tip is offset in position, the cutter holder moves to follow the electrode tip. Thus, an automatic alignment can be performed so that the center of rotation of the cutter to be held by the cutter holder coincides with the center of the electrode tip. It follows that the cutter can be mounted on the cutter holder in a fixed manner relative to the radial direction, and that no chattering occurs.

Further, there is conventionally known an electrode tip dresser in which a cutter having upper and lower cutting teeth for cutting a pair of upper and lower electrode tips of a welding gun is mounted on a cutter holder so that simultaneous dressing of both electrode tips can be performed by pinching the cutter by the pair of electrode tips. In this electrode tip dresser, it is normal practice to vertically fixedly mount the cutter in the cutter holder. Therefore, even if the upper and the lower electrode tips become different in cutting depth in the process of dressing work each of the electrode tips is independently dressed, resulting in different cutting depth between the two electrode tips.

In such a case, it is advantageous to make the cutter vertically movable for the following reasons. Namely, when the cutting reaction force increases due to an increase in the cutting depth in one of the upper and the lower electrode tips, the cutter is pushed by the cutting reaction force and will move towards the other electrode tip. As a result, the cutter is held in a position in which the cutting depth of the upper and the lower electrode tips are balanced, so that the cutting depth of both electrode tips become equal.

In addition, in a conventional electrode tip dresser, there is formed in a dresser main body an opening which faces a cutter. A guide plate having formed therein a guide hole for inserting the electrode tip is mounted on the surface in which the opening is formed, so as to cover the opening. The electrode tip is thus urged against the cutter through the guide hole.

There are various kinds of electrode tips, namely, those whose front end portion is to be dressed into a taper which is concentric with the axial line of the electrode tip, or into a taper which is eccentric to the axial line of the electrode tip, or into a taper which is inclined to the axial line of the electrode tip. It is therefore necessary to change the position and the angle of inserting the electrode tip into the cutter depending on the kind of electrode tip.

To cope with this demand, there is proposed the following electrode tip dresser in Japanese Published Examined Utility Model Application No. 39782/1974 and Japanese Published Examined Utility Model Application No. 30462/1981. Namely, a guide plate is detachably bolted to a dresser main body so that the guide plate can be changed to one having a guide hole which is suitable to the kind of electrode tip.

However, if the guide plate is bolted to the dresser main body, it takes time to replace the guide plate by loosening or tightening the bolt. Therefore, when electrode tips of different kinds are to be alternatively dressed, much time is consumed in the replacement of the guide plates, resulting in poor work efficiency.

Therefore, according to still another aspect of this invention, in order to simplify the replacement of the guide plates, that surface of the dresser main body which has formed therein an opening is provided with a slide groove in which the guide plate is engageable in one direction along the surface of the guide plate and a stopper portion which abuts a front end, in an inserting direction, of the guide plate, and a lock pin which is engageable with a rear end, in the inserting direction, of the guide plate is provided in a manner to project above and below the surface and to be urged by a spring towards the projecting direction.

BRIEF DESCRIPTION OF THE DRAWINGS

The above and other objects and the attendant advantages of this invention will become readily apparent by reference to the following detailed description when considered in conjunction with the accompanied drawings wherein:

FIG. 14 is a perspective view of another embodiment of a cutter to be used in the electrode tip dresser of the first embodiment;

FIG. 15 is a plan view thereof;

FIG. 18 is a plan view of a cutter and a supporting plate to be used in the electrode tip dresser of the second embodiment;

DETAILED DESCRIPTION OF PREFERRED EMBODIMENTS

Figure 1:
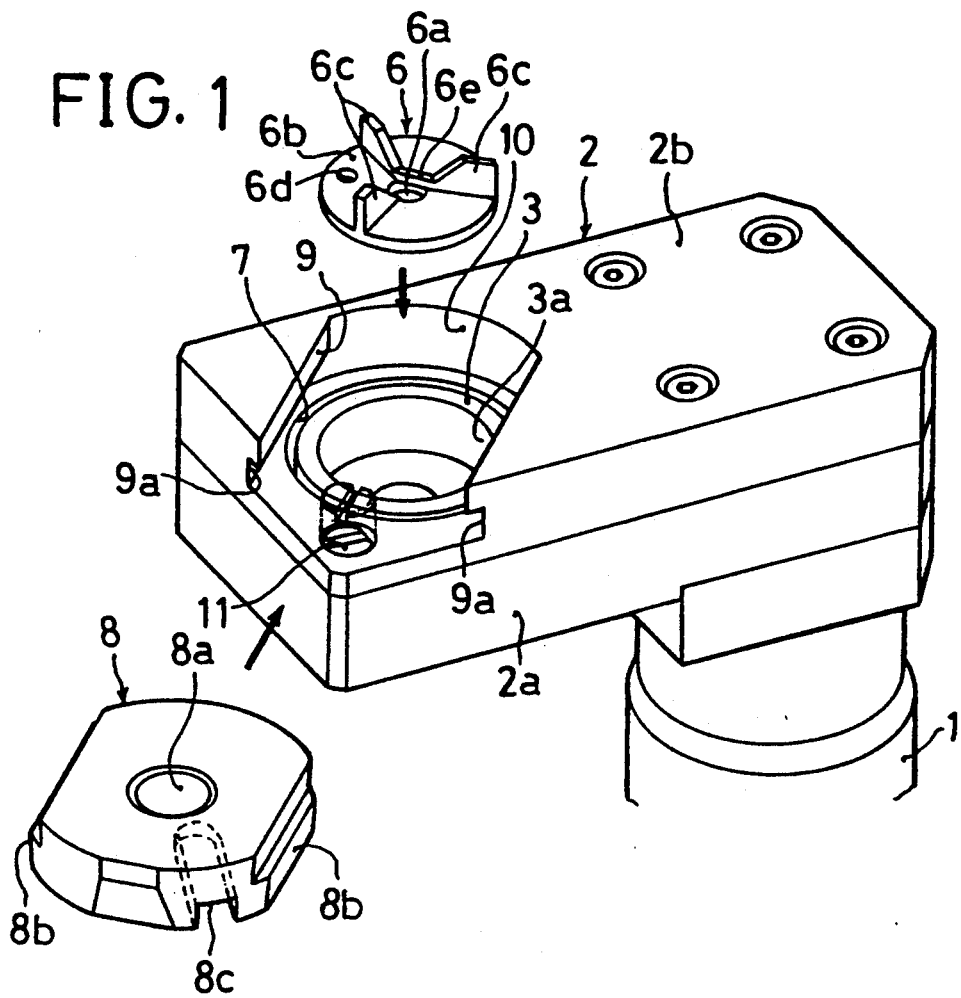
FIG. 1 is an exploded perspective view of a first embodiment of this invention electrode tip dresser.
Figure 2:
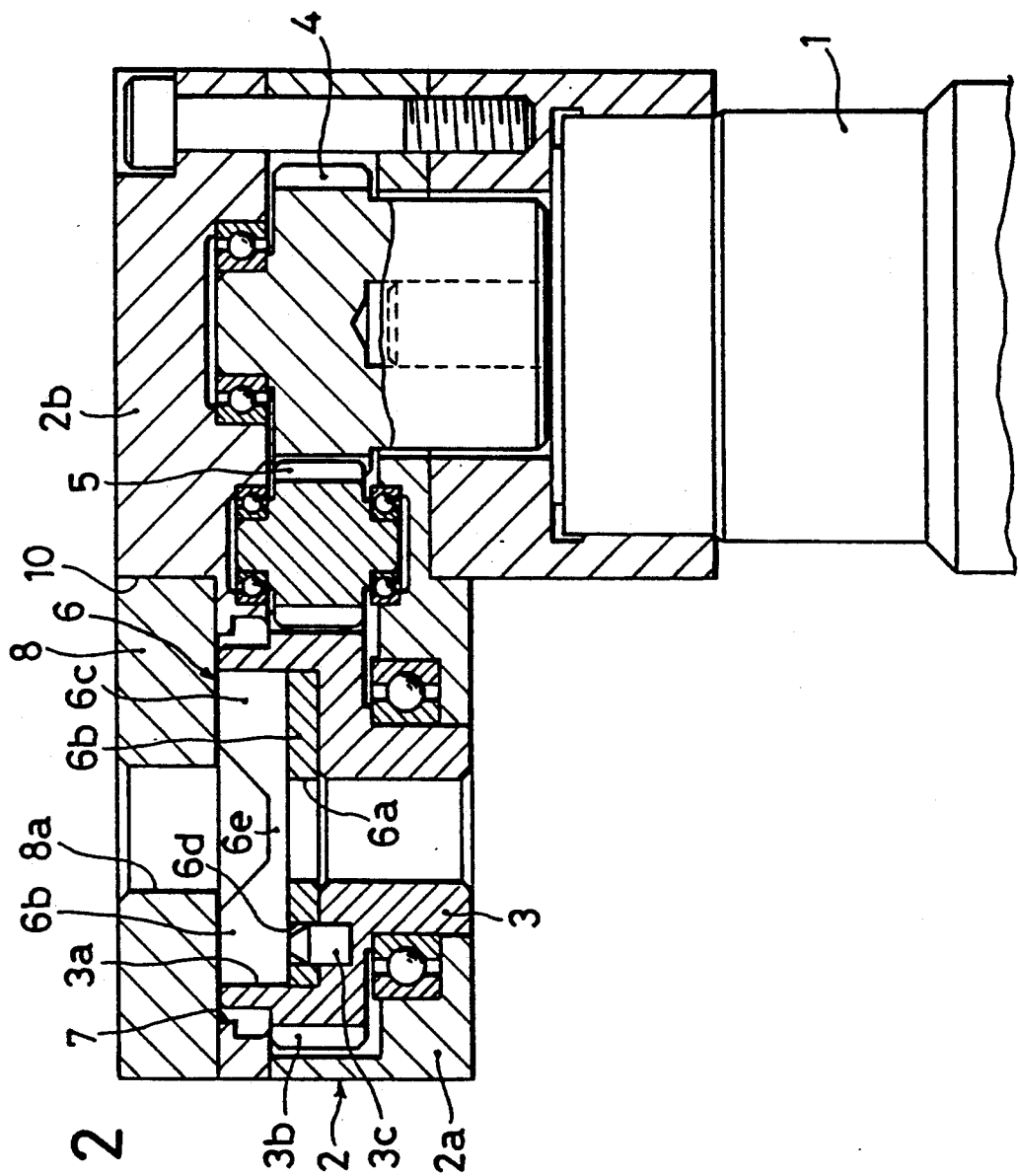
FIG. 2 is a sectional side view thereof.

An embodiment shown in FIGS. 1 and 2 is a portable type electrode tip dresser which comprises an air motor 1 which also serves as a grip and a substantially rectangular dresser main body 2 which extends to one side above the air motor 1. This tip dresser is formed, as a whole, into an L-shape.

The dresser main body 2 is made up of a lower base portion 2a which is formed into a framed box and an upper cover portion 2b. Inside the dresser main body 2, there are contained, on one side thereof, a cutter holder 3 which has formed on an upper surface thereof a concave portion 3a and on a periphery thereof a gear 3b FIG. 2 and, on the other side thereof, a driving gear 4 which is connected to the air motor 1 and, in an intermediate position, an idle gear 5 which connects the driving gear 4 to the gear 3b of the cutter holder 3. A cutter 6 is contained in the concave portion 3a of the cutter holder 3. It is thus so arranged that the cutter 6 is rotated by the operation of the air motor 1 via the driving gear 4, the idle gear 5 and the cutter holder 3.

On one side of the cover portion 2b of the dresser main body 2, there is formed an opening 7 which faces the cutter 6. A guide plate 8 which has formed therein a guide hole 8a for inserting therethrough an electrode tip W is mounted on the above-mentioned one side so as to cover the opening 7. The dressing or reforming of the electrode tip W is performed by rotating the cutter 6 while the electrode tip W is held abutted against the cutter 6 through the guide hole 8a.

Figures 7A, 7B, 7C:
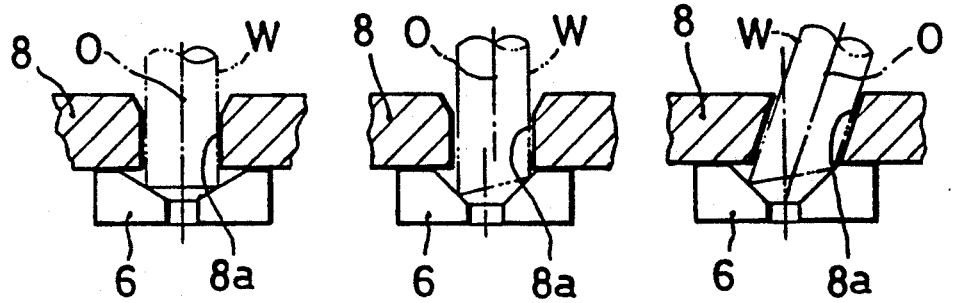
FIGS. 7(a), 7(b), 7(c) are views showing the relation between a guide plate and the shape of an electrode tip.

As regards the electrode tips W, there are the following kinds, namely, the one, as shown in FIG. 7(a), to be dressed into a taper which is concentric with the axial line 0 of the electrode tip; the one, as shown in FIG. 7(b), to be dressed into a taper which is eccentric with the axial line 0 of the electrode tip; the one, as shown in FIG. 7(c), to be dressed into a taper which is inclined to the axial line 0 of the electrode tip, or the like. It is necessary to change the inserting position or inserting direction of the electrode tip by employing for example, a guide plate 8 having a guide hole 8a to suit the electrode tip.

Figure 3:
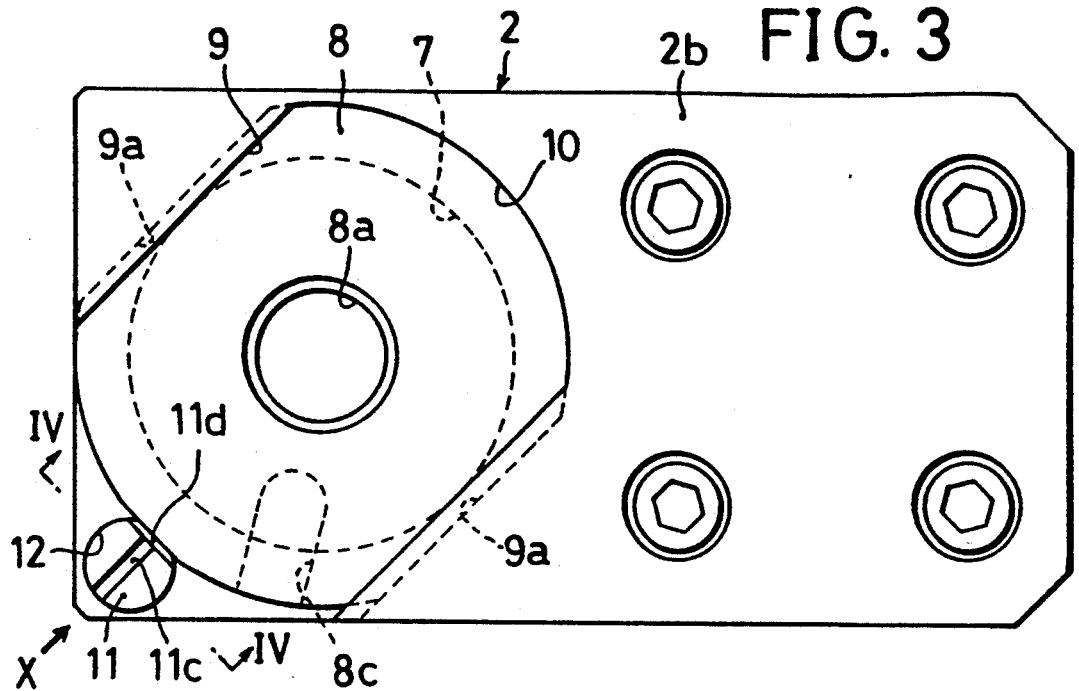
FIG. 3 is a plan view thereof.
Figure 4:
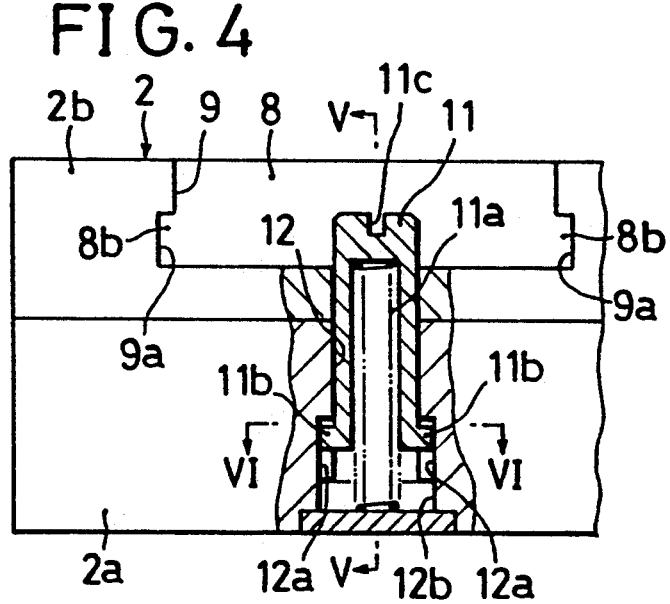
FIG. 4 is a sectional view partly in section taken along the line IV—IV in FIG. 3.

Therefore, the guide plate 8 is made to be insertable and withdrawable relative to the cover portion 2b along the surface in which the opening 7 is formed in the direction of an arrow X in FIG. 3. In more detail, as shown in FIGS. 3 and 4, there is formed in that surface of the cover portion 2b in which the opening 7 is formed, a slide groove 9 which is downwardly concaved and extends in the X direction. Engaging grooves 9a, 9a which are sidewise recessed are formed in the groove walls on both sides of the slide groove 9. The guide plate 8 is thus made to be insertable into, and withdrawable from, the slide groove 9 in the X direction in a condition in which projections 8b, 8b FIG. 1g formed on opposite side edges thereof are engaged with the engaging grooves 9a, 9a. Further, a stopper portion 10, which receives the X-direction front end surface of the guide plate 8, is formed in the X-direction front side wall of the slide groove 9. In the X-direction rear end at the bottom of the groove 9 there is also provided a lock pin 11 FIGS. 3, 4 and 5, which can be moved above or below the bottom of the groove 9 and is urged upwards by a spring 11a. The lock pin 11 is engaged with the X-direction rear end portion of the guide plate 8 so that the guide plate 8 can be fixed to a predetermined position at which the front end thereof abuts the stopper portion 10.

Figure 5:
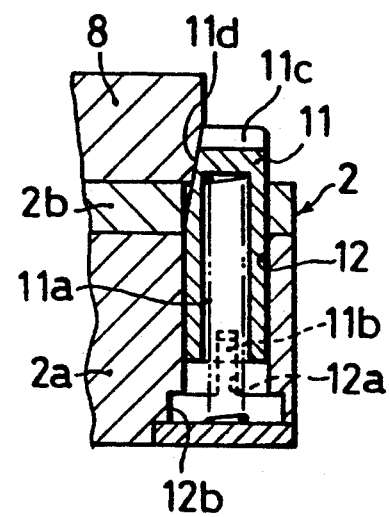
FIG. 5 is a sectional view taken along the line V—V in FIG. 4.
Figure 6:
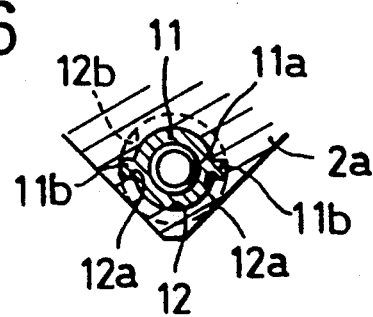
FIG. 6 is a sectional view taken along the line VI—VI in FIG. 4.

As shown in FIG. 6, the lock pin 11 is provided with a pair of guide projections 11b, 11b at its lower end. At the lower portion of the pin hole 12 which is formed at the bottom of the slide groove 9, there are formed a pair of guide grooves 12a, 12a FIGS. 4 and 5, which correspond to the guide projections 11b, 11b, as well as a stepped hole 12b of a larger diameter thereunder. When the lock pin 11 is pushed with a finger or the like and is turned, the guide projections 11b are engaged with the stepped surface at an upper end of the stepped hole 12b. As a result, the lock pin 11 is held depressed against the spring 11a. In this condition, the guide plate 8 is replaced by inserting it into, or withdrawing it from, the guide groove 9. The lock pin 11 is then turned so that the guide projections 11b become a phase in agreement with the guide groove 12a. The lock pin 11 is projected upwards by the urging force of the spring 11a while moving upwards the guide projections 11b along the guide grooves 12a. At the upper end of the lock pin 11, there is formed a groove 11c, as in the embodiment, or a projection for engagement with a finger.

That portion of the lock pin 11 which faces the guide plate 8 is formed into an inclined surface 11d as shown in FIG. 5 so that, by the wedge function of the inclined surface 11d, the guide plate 8 can be fixed in the X direction without giving rise to rattling.

In addition, in this embodiment, the X direction, i.e., the direction in which the guide plate 8 is inserted, is set to be the one which slantingly crosses the longitudinal direction of the dresser main body 2, thereby passing through a corner thereof on one side. The corner portion is then utilized as a space for disposing thereon the lock pin 11, to improve the space efficiency.

At the bottom of the guide plate 8, there is provided a chip-discharging groove 8c which opens into the opening 7.

Figure 8:
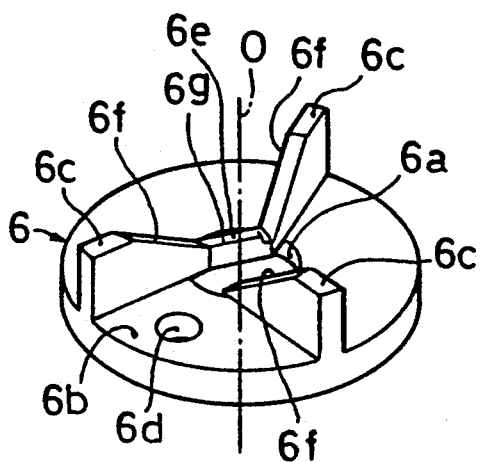
FIG. 8 is a perspective view of a cutter to be used in the electrode tip dresser of the first embodiment.
Figure 9:
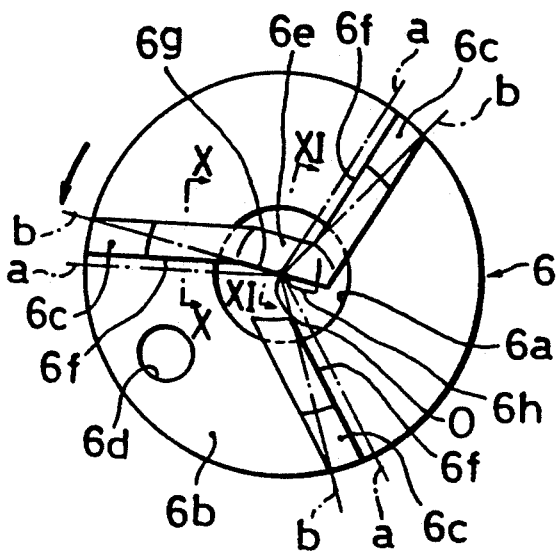
FIG. 9 is a plan view thereof.
Figure 10:
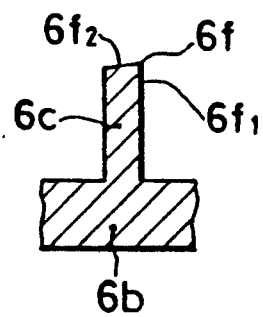
FIG. 10 is a sectional view taken along the line X—X in FIG. 9.
Figure 11:
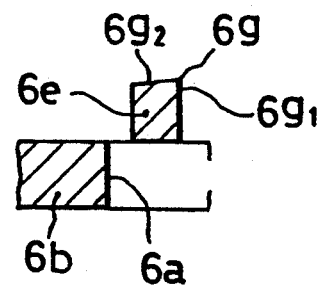
FIG. 11 is a sectional view taken along the line XI—XI in FIG. 9.

The cutter 6 comprises, as shown in FIGS. 8 and 9, a circular base plate 6b which has at its central portion a chip-discharging hole 6a, and a plurality, e.g., 3 pieces, of cutter blades 6c which are integrally and vertically provided on the base plate 6b at a spaced-apart relationship in the circumferential direction thereof. The base plate 6b is seated on the bottom surface of the concave portion 3a of the cutter holder 3. A lock pin 3c, which is vertically provided on the bottom surface of the concave portion 3a is caused to be fitted into a pin opening 6d which is formed in the base plate 6b (see FIG. 2) so that the cutter 6 is prevented from rotating relative to the cutter holder 3. The cutter 6 has a bridge 6e which bridges diametrically inner ends of predetermined two pieces of cutter blades 6c, 6c across the chip-discharging hole 6a. The bridge 6e makes up a flat portion which faces the front end surface of the electrode tip W. Three pieces of cutter blades 6c respectively make up rising portions. On each of the cutter blades 6c, there are formed a cutting tooth 6f for cutting the front peripheral portion of the electrode tip W and, on the bridge 6e, there is a cutting tooth 6g for cutting the front end surface of the electrode tip W. Each of these cutting teeth 6f, 6g has, as shown in FIGS. 10 and 11, a rake face $6f_1$, $6g_1$ on the front side in the direction of rotation (counterclockwise direction in FIG. 9) and a flank $6f_2$, $6g_2$ on the upper side.

The cutting tooth 6g for cutting the front end surface of the electrode tip is made up of a single cutting tooth which extends from that central point 0 as an origin which coincides with the axis of rotation of the cutter holder 2, to a predetermined radial direction. An origin portion of the cutting tooth 6g also extends beyond the central point 0 towards a direction which is opposite to the abovementioned radial direction. Since this extended portion 6h has the rake face which looks backwards in the direction of rotation of the cutter 6, it does not perform the function of cutting the front end surface of the electrode tip, but it performs a function of rubbing or stroking the front end surface to make it smooth. Normally, the edge or end of the extended portion 6h is short of rigidity and is likely to break. Even if the edge or end thereof is broken, there still does exist the cutting tooth 6g up to the central point 0. Therefore, there is no possibility that the central portion in the front end surface of the electrode tip is left uncut. In addition, even if the central point 0 of the cutter 6 deviates in the longitudinal direction of cutting tooth 6g relative to the axis of rotation of the cutter holder 3 due to loose assembling or the like of the cutter 6 into the cutter holder 3, the extended portion 6h functions as the cutting tooth, resulting in no uncut portion.

The chips generated by cutting the front end portion of the tip are effectively discharged out of the chip-discharging hole 6a.

Each of the cutting teeth 6f for cutting the front peripheral portion of the electrode tip is formed such that it rises radially outwards at a predetermined inclination along a plane which is parallel with a predetermined radial plane "a" inclusive of the axis of rotation 0 and is offset rearwards in the direction of rotation of the cutter. It follows that the cutting tooth 6f is inclined forwards in the direction of rotation relative to a radial plane b which passes through a radially internal end of the cutting tooth 6f. The force in the direction of biting into the electrode tip W at the time of cutting thereof is added to the cutter 6 and, thanks to this force, the cutting reaction force in the axial direction is cancelled. Therefore, it becomes possible to dress the electrode tip W simply by lightly pressing the electrode tip dresser against the electrode tip W.

Figure 12:
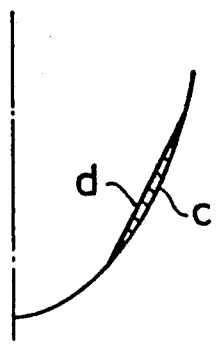
FIG. 12 is a diagram explaining the condition of cutting an electrode tip periphery by the cutter shown in FIG. 8.
Figure 13:
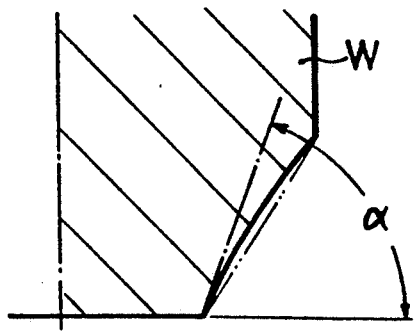
FIG. 13 is a vertical sectional view of an electrode tip cut by the cutter shown in FIG. 8.

A side of a cross section of a conical body along a plane which is parallel with a radial plane passing through the center line of the conical body, is a parabola as shown by line c in FIG. 12. In this embodiment, since the cutting tooth 6f rises, as shown by line d in FIG. 12, at a predetermined inclination along a plane which is parallel with a radial plane, the hatched portion shown in FIG. 12 is cut off. The front peripheral surface of the electrode tip W will be, as shown by a solid line in FIG. 13, a surface of curvature which is slightly indented inwards from the tapered surface as shown by an imaginary line in FIG. 13. Therefore, the angle α between that surface of a workpiece which the front end surface of the electrode tip comes into contact and the front peripheral surface of the electrode tip becomes large. As a consequence, when a material coated with a coating material such as galvanizing is welded, the slag of the coating material becomes hardly adhered to the front peripheral surface of the electrode tip, resulting in less frequent dressing work of the electrode tip.

In the above-mentioned embodiment, the cutting tooth 6g is formed in a straight line. It may also be formed as shown in FIGS. 14 and 15 in which an external end portion of the cutting tooth 6g is arched when viewed in its horizontal section so that it forms a continuous line to the cutting tooth 6f of the cutter blade 6c at one end of the bridge 6e.

Figure 16:
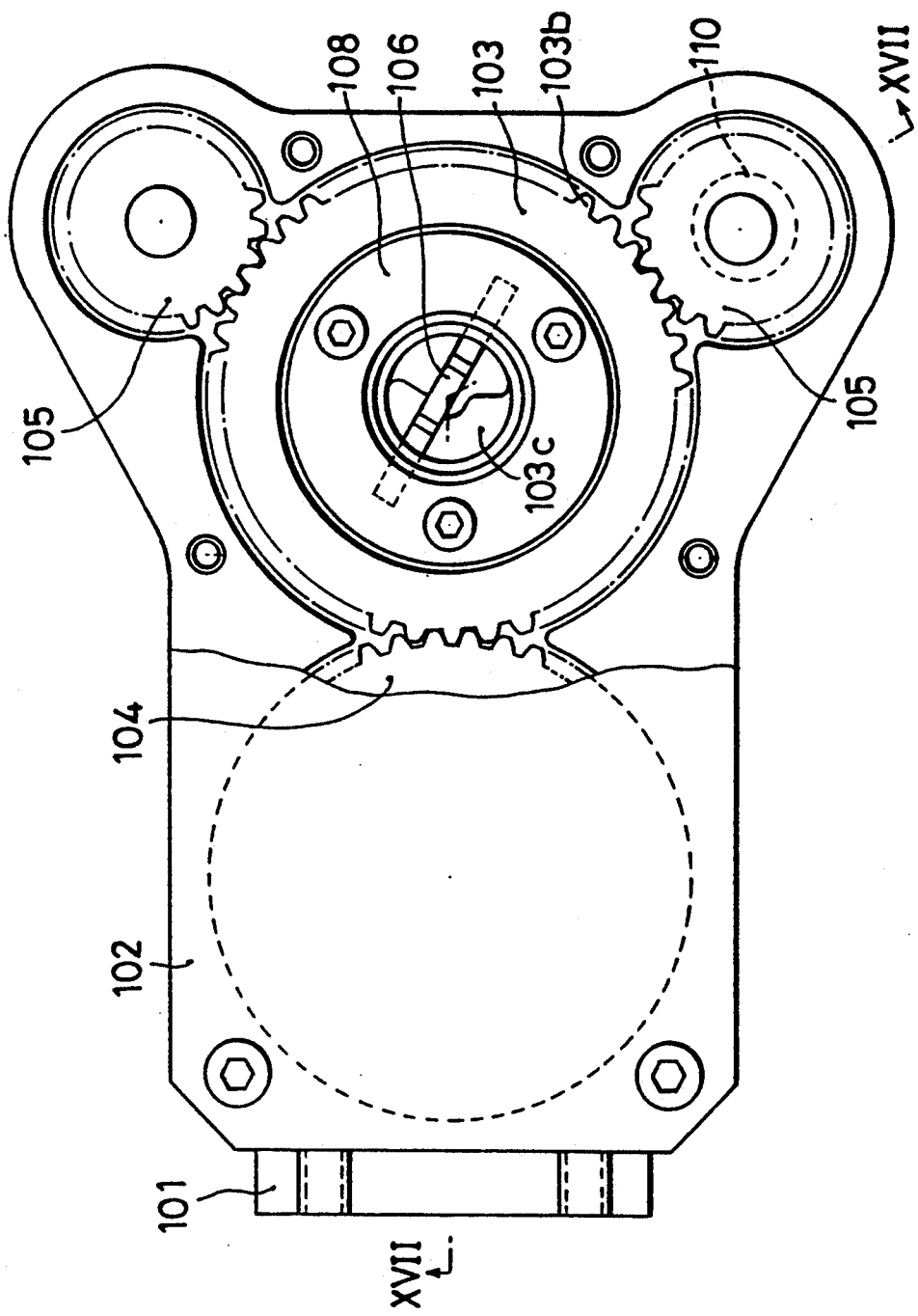
FIG. 16 is a plan view of a second embodiment of this invention electrode tip dresser.
Figure 17:
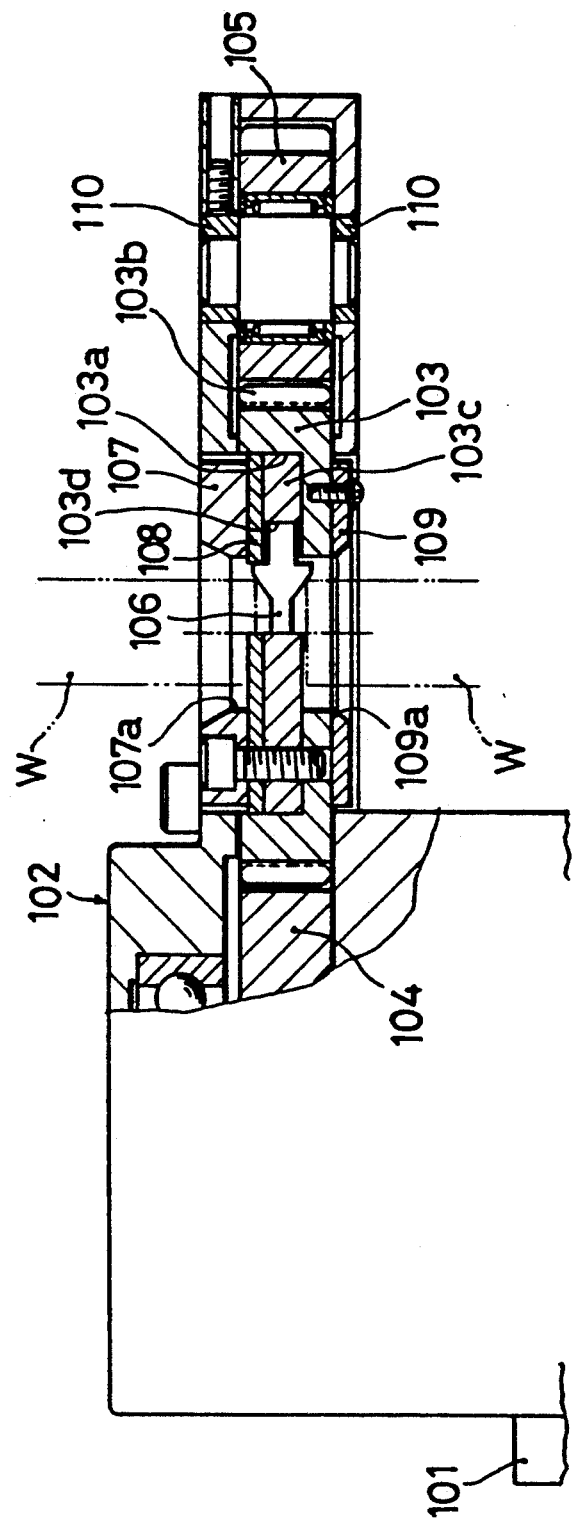
FIG. 17 is a sectional view taken along the line XVII—XVII in FIG. 16.

FIGS. 16 and 17 show a stationary type electrode tip dresser in which a pair of electrode tips W, W to be mounted on a robot or the like are dressed or reformed. The electrode tip dresser comprises a dresser main body 102 having a mounting base 101 which is fixed on an unillustrated apparatus frame, and a cutter holder 103 which is rotatably supported from three sides inside the dresser main body 102 by a driving gear 104 which meshes with a gear 103b on the periphery of the cutter holder 103 and two pieces of supporting gears 105, 105. The cutter holder 103 is provided with a supporting plate 103c which is contained inside a concave portion 103a. A single-plate cutter 106 which has upper and lower cutting teeth is fit into a diametrically longitudinal slit-like groove 103d formed as shown in FIG. 18. An upper guide plate 107, a holding plate 108 for holding the cutter 6 and a supporting plate 103c are tightened together. In addition, a lower guide plate 109 is bolted to the lower surface of the cutter holder 103. A pair of electrode tips W, W are thus made, by the closing movement of the welding gun, to abut the upper and the lower cutting teeth of the cutter 6 through guide holes 107a, 109a provided in each of the guide plates 107, 109.

Figure 19:
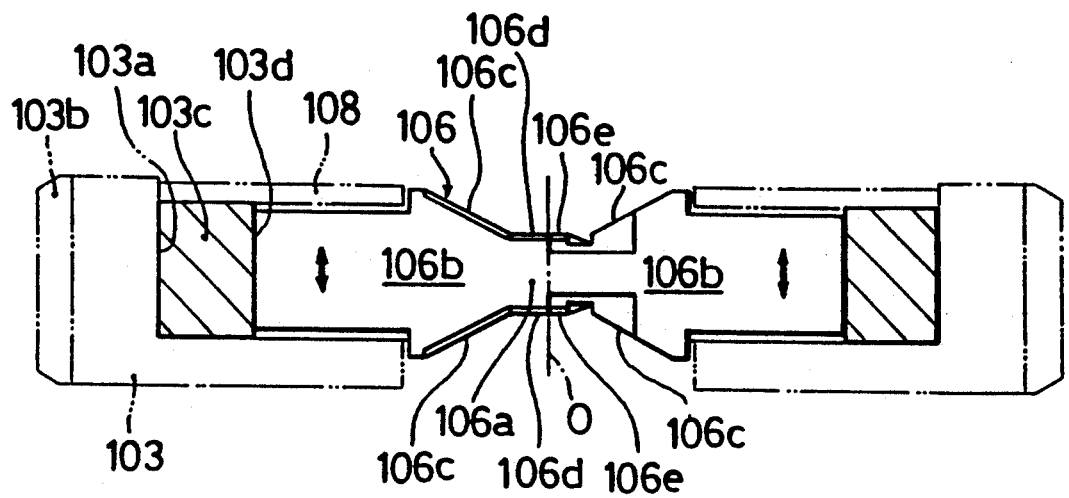
FIG. 19 is a sectional view taken along the line XIX—XIX in FIG. 18.

The upper and the lower cutting teeth of the cutter are formed so as to be in plane-symmetry with each other. The construction of the upper and the lower cutting teeth is explained in detail hereinbelow with reference to FIGS. 18 and 19.

Figure 20:
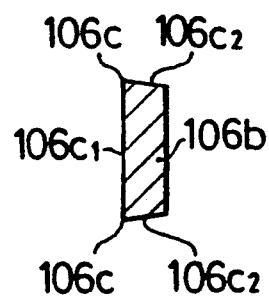
FIG. 20 is a sectional view taken along the line XX—XX in FIG. 18.
Figure 21:
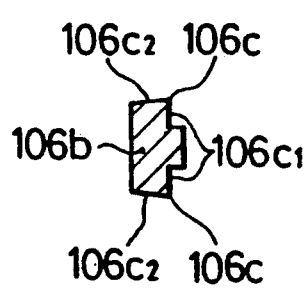
FIG. 21 is a sectional view taken along the line XXI—XXI in FIG. 18.

In this embodiment, the above-mentioned groove 103d is so arranged that its widthwise center line is parallel with a predetermined diametrical line of the supporting plate 103 and is slightly offset in a widthwise direction. That central point 0 of the cutter 106 which coincides with the axis of rotation of the cutter holder 103 is thus offset to one side from the thickness-wise center of the cutter 106. The lengthwise central portion of the cutter 6 is concaved to form therein a flat portion 106a which faces the front end surface of the electrode tip as well as rising portions 106b, 106b on both ends thereof. Out of the rising portions, the one 106b whose one side surface having a smaller thickness-wise distance from the central point 0 looks towards the rotational direction of the cutter (clockwise direction in FIG. 18), is formed with a cutting tooth 106c which is provided, as shown in FIG. 20, with a rake face $106c_1$ on one side and a flank $106c_2$ on its upper side. The other rising portion 106b is formed with a cutting tooth 106c which is provided, as shown in FIG. 21, with a rake face $106c_1$ formed on a front side in the rotational direction and a flank $106c_2$ on its upper side. The front peripheral portion of the electrode tip is thus cut with both cutting teeth 106c, 106c.

Figure 22:
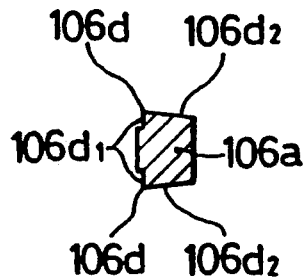
FIG. 22 is a sectional view taken along the line XXII—XXII in FIG. 18.

In the flat portion 106a there is formed, as shown in FIG. 22, a cutting tooth 106d having a face $106d_1$ in the form of a notch formed on the above-mentioned one side surface as well as a flank $106d_2$ on its upper side, such that the cutting tooth 106d diametrically extends from the central point 0 as an origin towards the starting end of the cutting tooth 106c of the above-mentioned one of the rising portion 106b and, an origin portion of the cutting tooth 106d extends to the opposite side beyond the central point 0. The front end surface of the electrode tip W is thus cut with the cutting tooth 106d and, like in the above-mentioned embodiment, the oppositely extended portion 106e prevents the center portion of front end surface of the electrode tip from being left uncut.

In case the above-mentioned groove 103d is formed along the diametrical line of the supporting plate 103c and the central point 0 is located in the thickness-wise center of the cutter 3, each of the cutting teeth 106c, 106d will have to be formed such that the rack faces thereof lie along the thickness-wise center line of the cutter 106. As a consequence, the thickness of each of the cutting teeth 106c, 106d will become about half that of the cutter 106. If, on the other hand, the central point 0 is made closer to one side surface of the cutter 106 as in this embodiment, it is advantageous in that the thickness of each of the cutting teeth 106c, 106d can be maintained rather thick even if the width of the cutter 106 is not increased. The groove 103d may be formed such that the central point 0 coincides with one side of the cutter 106. In this arrangement, however, the cutting tooth 106c to be formed on the other rising portion 106b, the other side surface of which looks towards the front of the direction of rotation, must be largely inclined towards the above-mentioned one side surface approaching the central point 0. As a consequence, the thickness of the cutting tooth 106c is decreased. Therefore, it is preferable to form the groove 103d so that the central point 0 is positioned in a slightly inside of one side surface, as in this embodiment. In FIG. 18, numeral 103e denotes chip-discharging holes which are formed in the supporting plate 103c. In the chip-discharging hole 103e on one side of the groove 103d, there is integrally formed an opening portion 103f for receiving therein chips by the cutting tooth 106d. Here, by making the groove 103d to offset relative to the diametrical line of the supporting plate 103c, it becomes possible to form on the abovementioned one side of the groove 103d a larger chip discharging hole 103e having the opening portion 103f. This leads to an improved chip discharging efficiency.

In addition, the cutter 106 is fit into the groove 103d to allow for a slight sliding in a vertical direction. Therefore, when the cutting depth of one of the upper and the lower electrode tips becomes larger, the cutter 106 is pushed towards the other of the electrode tips by the cutting reaction force so that the cutter 106 can be automatically adjusted in its position to have an equal amount of cutting depth. As another embodiment, the cutter holder 103 may be vertically movably supported on the dresser main body 102 so that the cutter 106 is vertically movable.

Each of the above-mentioned cutting teeth 106c is inclined rearwards in the direction of rotation relative to the line "a" drawn to connect the end edge on the side of the flat portion 106a and the central point 0. The biting of the cutter into the electrode tip is thus minimized so that the electrode tip can be cut in a smooth manner.

The above-mentioned embodiment refers to one in which the longitudinal central portion of the cutter 106 is concaved to form therein the flat portion 106a and the rising portions 106b, 106b; thereby dressing the front end portion of the electrode tip into a truncated cone. In case the end shape of the electrode tip is different from that in the above-mentioned embodiment, the cutter 106 may be formed into a concave having a continuous curve to conform to the end shape of the electrode tip.

Figure 23:
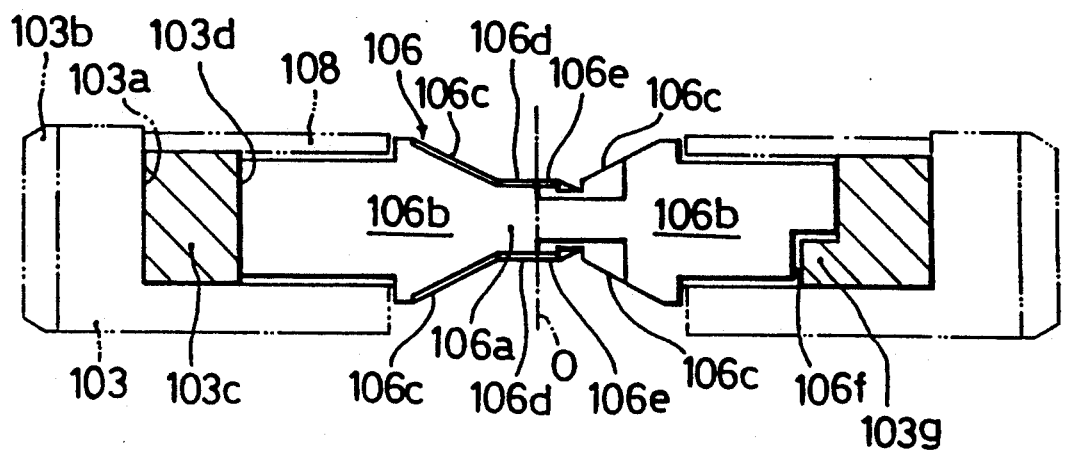
FIG. 23 is a sectional view of another example corresponding to FIG. 19.

As shown in FIG. 23, the following embodiment may also be employed. Namely, a notched portion 106f is provided in such a corner in the longitudinal direction of the cutter 106 as will lie in the bottom side when the cutter 106 is normally inserted into the groove 103d as illustrated. A projection 103g which conforms to the notched portion 106f is provided on the side of the supporting plate 103c. In this manner, when the cutter 106 is tried to be inserted in a longitudinally opposite direction or upside down against the normal condition, the cutter 106 is unable to be set in position, thereby preventing the cutter 206 from being wrongly assembled at the time of setting.

The above-mentioned pair of supporting gears 105, 105 are rotatably supported by the dresser main body 102 via an eccentric bush 110 as shown in FIGS. 16 and 17. By rotatably adjusting the bush 110, the backlashes of the above-mentioned driving gear 104 and each of the supporting gears 105 relative to the gear 103b on the periphery of the cutter holder 103 are adjusted so that the cutter holder 103 can be movable within a predetermined range.

Figure 24:
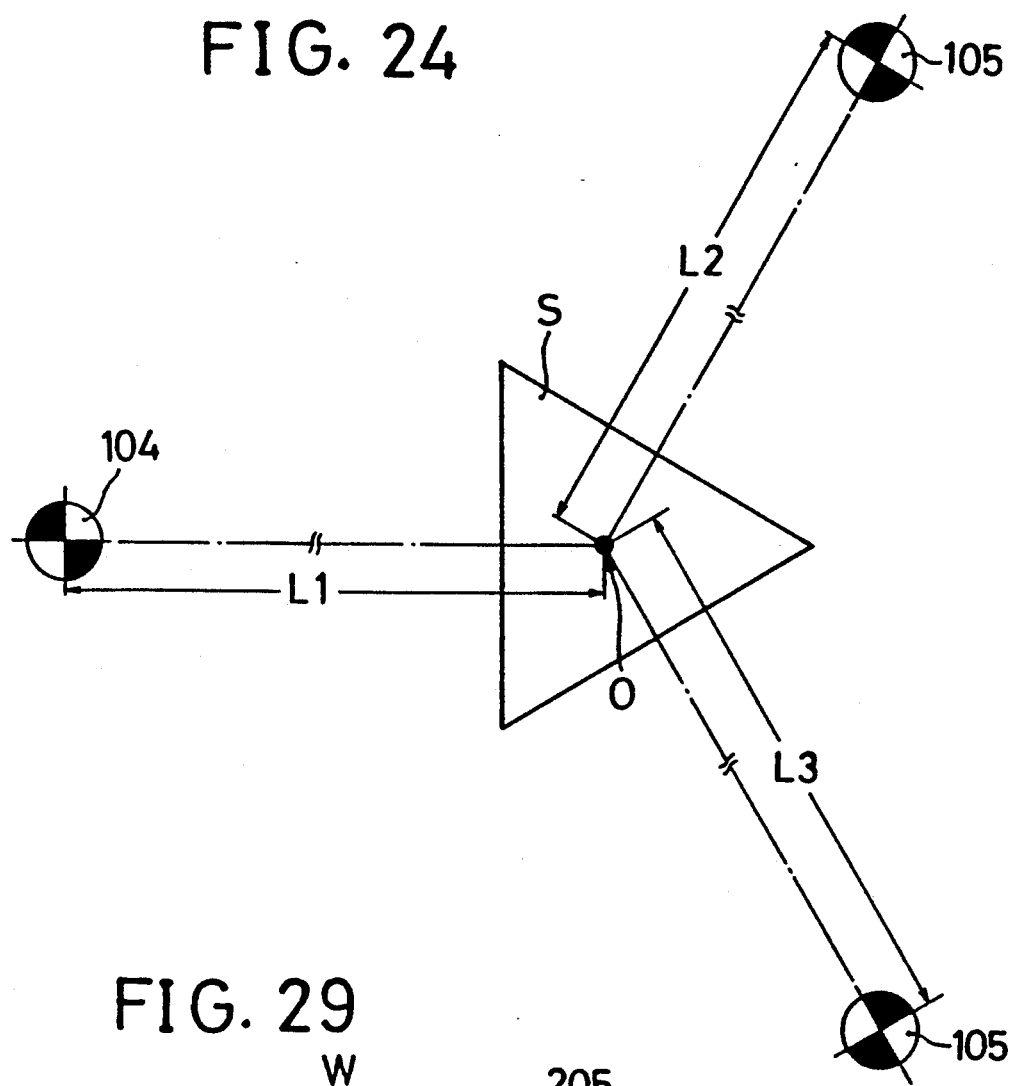
FIG. 24 is a diagram explaining the movement of a cutter holder.

As an example of a moving range of the cutter holder 103, an explanation is made with reference to FIG. 24, in which each of the gears 104, 105 is shown by its center, numeral 0 denotes the center of rotation of the cutter holder 103 and L1 through L3 denote the distances between the center 0 and the center of each of the gears. In the above-mentioned embodiment, the number of teeth of the driving gear 104 and the gear 103b of the cutter holder is set to be 36, and that of each of the supporting gears 105 is set to be 18. The module is set to be 2 and the pressure angle is set to be 20°. Therefore, L1 becomes 72 mm and L2 and L3 both become 54 mm. Normally, the amount of backlash is set to a minimum value within a range in which each of the gears is rotatable; for example, the backlash is set to be 25 μm–50 μm according to the above-mentioned specification. In this embodiment, however, the amount of backlash is set to be 50 μm–100 μm which is double the amount of normal backlash. As a result, since each of the dimensions L1-L3 can be shortened by 146 μm–292 μm as compared with the case in which the backlash is zero, the center of rotation 0 can be movable within an approximately equilateral triangles having each side of 0.5 mm–1.0 mm.

Consequently, the offset between the cutter holder 103 and the electrode tip W is automatically adjusted by the radial movement of the cutter holder 103, and the electrode tip can thus be accurately dressed.

Figure 25:
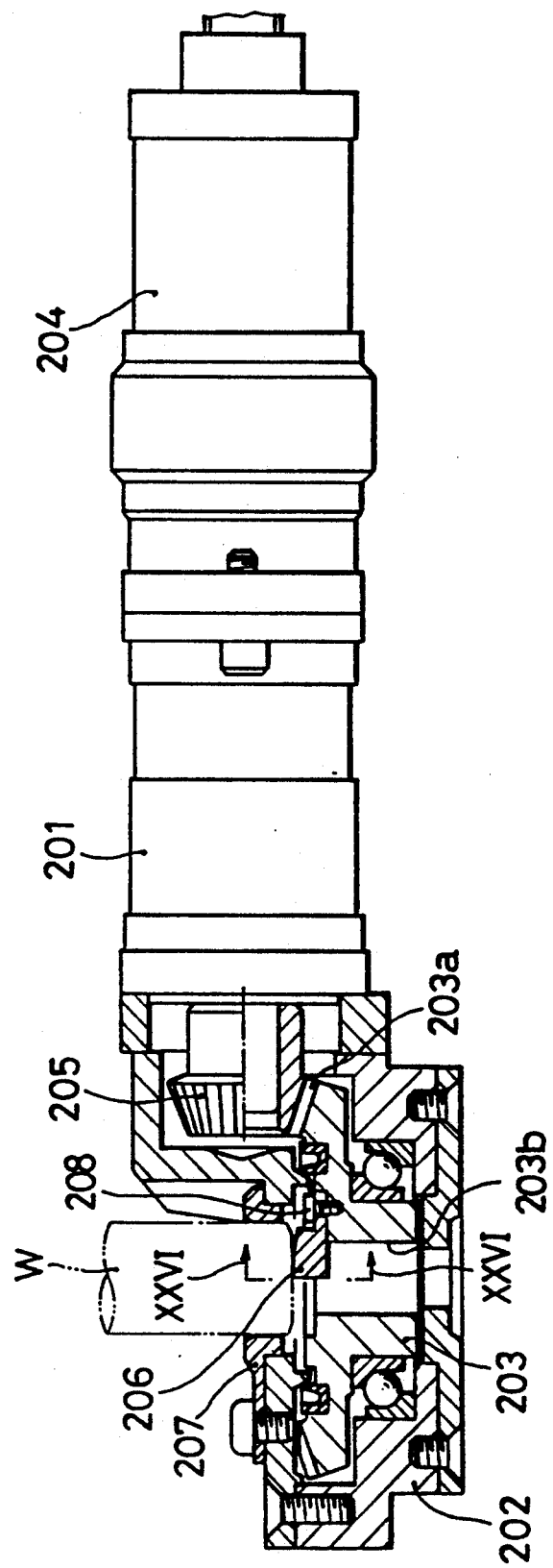
FIG. 25 is a sectional side view of a third embodiment of this invention electrode tip dresser.

FIG. 25 shows still another embodiment which comprises a frame-like dresser main body 202 which is mounted on a grip portion 201, a cutter holder 203 which is rotatably held inside the dresser main body 202, and a driving gear 205 connected to a motor 204 which is assembled to the grip portion 201. A gear 203a which meshes with the driving gear 205 is provided in the periphery of the cutter holder 203 so that the cutter holder 203 can be rotated in forward and reverse directions by the motor 204 via the driving gear 203a. The electrode tip W is abutted, through a guide plate 207 provided on an upper surface of the dresser main body 202, against a cutter 206 which is held by the cutter holder 203. The front end portion of the electrode tip is thus cut by the rotation of the cutter 206 accompanied by the rotation of the cutter holder 203. In FIG. 25, numeral 203b denotes a chip-discharging hole which is provided in the cutter holder 203.

Figure 26:
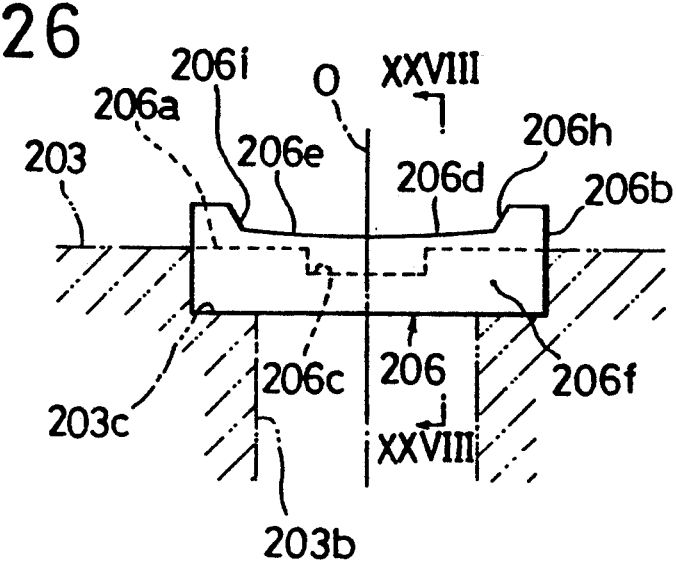
FIG. 26 is a front view viewed from the line XXVI—XXVI in FIG. 25.
Figure 27:
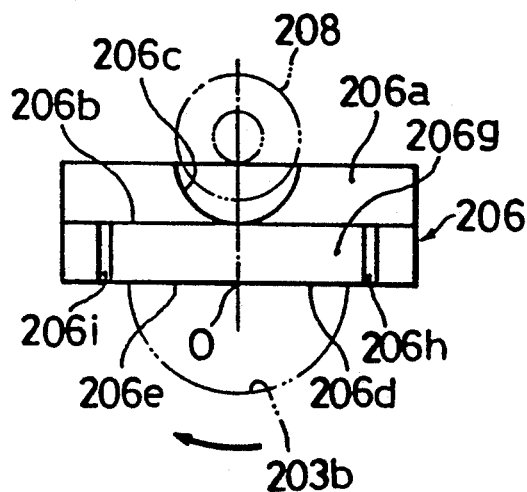
FIG. 27 is a plan view thereof.
Figure 28:
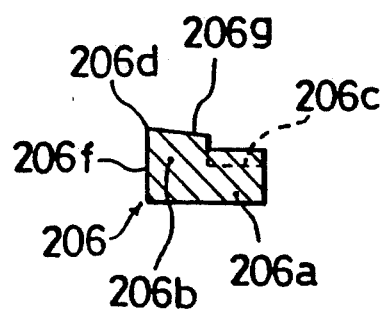
FIG. 28 is a sectional view taken along the line XXVIII—XXVIII in FIG. 26.

The cutter 206 comprises, as shown in FIGS. 26 through 28, a cutter main body which is made up by a single piece of plate member which has an L-shaped cross section and is longitudinal in the diametrical direction of the cutter holder 203. On an upper surface of the cutter holder 203, there is formed a concave groove 203c which receives a horizontal base portion 206a of the cutter main body. The cutter 206 is thus aligned by the concave groove 203c so that the front face of a vertical portion 206b of the cutter main body is positioned in a predetermined diametrical line of the cutter holder 203. The cutter 206 is then fixed to the cutter holder 203 by a tightening bolt 208 FIG. 25, which has a head portion to engage with a concave portion 206c which is provided in a central portion of a base portion 206a.

The vertical portion 206b of the cutter main body has formed therein a main cutting tooth 206d which extends from the central point 0, which coincides with the center of rotation of the cutter holder 203, to one longitudinal direction of the cutter main body, and an auxiliary cutting tooth 206e which extends from the central point 0 to a longitudinally opposite direction of the cutter main body and is in plane-symmetry with the main cutting tooth 206d. The rake faces 206f of the main and the auxiliary cutting teeth 206d, 206e are formed flush with the front surface of the vertical portion 206b which is positioned in the abovementioned diametrical line. The flanks 206g of the main and the auxiliary cutting teeth 206d, 206e are also flush with the upper surface of the vertical portion 206b by providing rearwardly inclined relief angles. In addition, on an external end portion of each of the cutting teeth 206d, 206e, there are formed rising portions 206h, 206i for cutting the front peripheral portion of the electrode tip.

Suppose that the normal direction of rotation of the cutter holder 203 is clockwise in FIG. 27, the front end portion of the electrode tip is cut by the main cutting tooth 206d in its normal direction of rotation. At this time, the auxiliary cutting tooth 206e performs the function of rubbing the surface of the electrode tip to thereby smooth its surface. In addition, when the electrode tip W is out of alignment in the longitudinal direction of the cutter 206, the auxiliary cutting tooth 206e operates to cut the off-alignment portion of the electrode tip. Consequently, the cutting can be performed without leaving uncut the central portion of the front end surface of the electrode tip. When the main cutting tooth 206d has become worn and poor in its cutting quality, the cutter is rotated in the opposite direction so that the front end surface of the electrode tip can be cut by the auxiliary tooth 206e.

Figure 29:
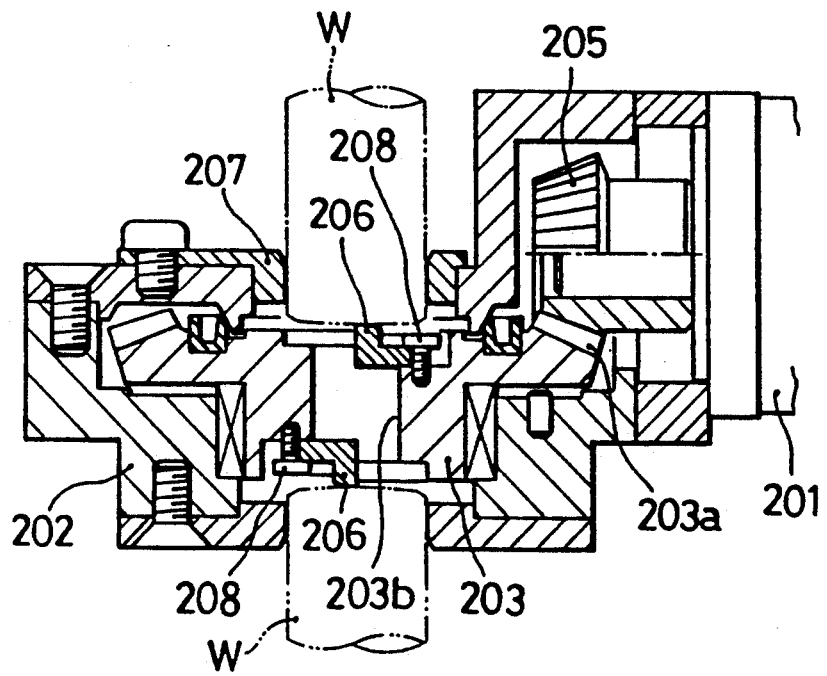
FIG. 29 is a sectional side view of a modified example of the electrode tip dresser of the third embodiment.

As shown in FIG. 29, in case where the cutters 206, 206 are mounted on the upper and the lower sides respectively of the cutter holder 103 to dress a pair of electrode tips W, W at the same time, the above-mentioned cutter can be commonly used as the upper cutter and the lower cutter, respectively. Each of the electrode tips W can thus be cut by the main cutting tooth of one 206 of the cutters and the auxiliary cutting tooth of the other 206 of the cutters.

It is readily apparent that the above-mentioned electrode tip dresser and the cutter for the electrode tip dresser have the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A cutter for use in an electrode tip dresser which has a cutter holder for holding said cutter and dresses an electrode tip for a resistance welding apparatus, said cutter comprising:

a rising portion which has a cutting tooth for cutting a front peripheral portion of the electrode tip; and
a flat portion which faces a front end surface of the electrode tip;
said flat portion comprising a single cutting tooth for cutting the front end surface of the electrode tip;
said single cutting tooth extending from a central point of said cutter as an origin which coincides with an axis of rotation of said cutter holder towards a predetermined radial direction;
an origin portion of said single cutting tooth further extending beyond said central point towards a direction which is opposite to said radial direction;
a base plate seated on said cutter holder, said base plate comprising a plurality of cutter blades which are integrally and vertically provided on said base plate in radial directions, each of said cutter blades forming said rising portion; a chip-discharging hole formed in a central portion of said base plate; and a bridge formed for bridging diametrically internal ends of predetermined two pieces of cutter blades of said plurality of cutter blades across said chip-discharging hole to thereby form said flat portion.

2. A cutter for use in an electrode tip dresser according to claim 1, wherein said cutting tooth for cutting the front peripheral portion of the electrode tip is formed to rise radially outwards at a predetermined inclination along a plane which is parallel with a predetermined radial plane inclusive of said axis of rotation of said cutter holder and is offset rearwards in the direction of rotation of said cutter.

3. A cutter for use in an electrode tip dresser which has a cutter holder for holding said cutter and dresses an electrode tip for a resistance welding apparatus, said cutter comprising:
 a cutter main body formed by a single piece of plate member which is longitudinal in the diametrical direction of said cutter holder;
 a main cutting tooth for cutting the electrode tip, said main cutting tooth extending, from a central point which coincides with an axis of rotation of said cutter holder, towards one longitudinal direction of said cutter main body; and
 an auxiliary cutting tooth which is in plane-symmetry with said main cutting tooth and extends from the central point towards a longitudinally opposite direction of said cutter main body.

4. An electrode tip dresser for dressing an electrode tip for a resistance welding apparatus, said tip dresser comprising a rotatably driven cutter holder mounted on a dresser main body and a cutter of a single plate construction, said cutter being held in an insertable manner in a slit-like groove which is provided in said cutter holder and extends in the diametrical direction of said cutter holder, thereby cutting a front end portion of the electrode tip, wherein:
 said groove is formed in said cutter holder such that a widthwise center line of said groove is parallel with a predetermined diametrical line of said cutter holder and is slightly offset in a widthwise direction of said groove relative to said diametrical line;
 a central point, which coincides with an axis of rotation of said cutter holder, of said cutter to be held in an insertable manner in said groove is offset from the thickness-wise center of said cutter towards one thickness-wise side surface of said cutter;
 a cutting tooth for cutting the front end surface of the electrode tip is formed on said one side surface of said cutter so as to extend to one longitudinal direction of said cutter through said central point: and
 a cutting tooth for cutting a front peripheral portion of the electrode tip is formed on an opposite side surface of said cutter so as to extend from an origin, which is away from said central point by a predetermined distance, to a longitudinally opposite direction of said cutter.

5. An electrode tip dresser for dressing an electrode tip for a resistance welding apparatus, said tip dresser comprising a rotatably driven cutter holder provided on a dresser main body and a cutter which is held by said cutter holder, thereby cutting a front end portion of the electrode tip, wherein:
 a gear is formed on a periphery of said cutter holder; and
 a driving gear to be driven by a rotatably driving means and two pieces of supporting gears are respectively engaged at three peripheral points with said gear of said cutter holder while maintaining a respective backlash which allows a play of said cutter holder, whereby said cutter holder is radially movably supported by said driving gear and said supporting gears.

6. An electrode tip dresser according to claim 5, wherein at least one of said two pieces of supporting gears are rotatably supported on said dresser main body via an eccentric bush.

7. An electrode tip dresser for simultaneously dressing a pair of upper and lower electrode tips of a resistance welding apparatus, comprising:
 a cutter holder which is rotatably driven and is mounted on a dresser main body; and
 a cutter which is held by said cutter holder and has upper and lower cutting teeth for cutting a front end portion of each of the electrode tips, wherein
 said cutter is supported so as to be movable in a vertical direction relative to said dresser main body.

8. An electrode tip dresser for dressing an electrode tip for a resistance welding apparatus, comprising:
 a dresser main body which rotatably contains therein a cutter for cutting the electrode tip and is provided with an opening facing said cutter;
 a guide plate which has a guide hole for inserting therein the electrode tip, said guide plate being mounted on that surface of said dresser main body which has formed therein said opening, thereby covering said opening, wherein
 said surface of said dresser main body is provided with a slide groove in which said guide plate is engaged in one direction along said surface and a stopper portion which abuts a front end, in an inserting direction, of said guide plate, and
 a lock pin which is engageable with a rear end, in said inserting direction, of said guide plate is provided in a manner to project above and below said surface and to be urged by a spring towards the projecting direction.

* * * * *